Sept. 2, 1952          J. G. McKENZIE          2,609,112
ELEVATOR APPARATUS
Filed March 26, 1949                                  3 Sheets-Sheet 1
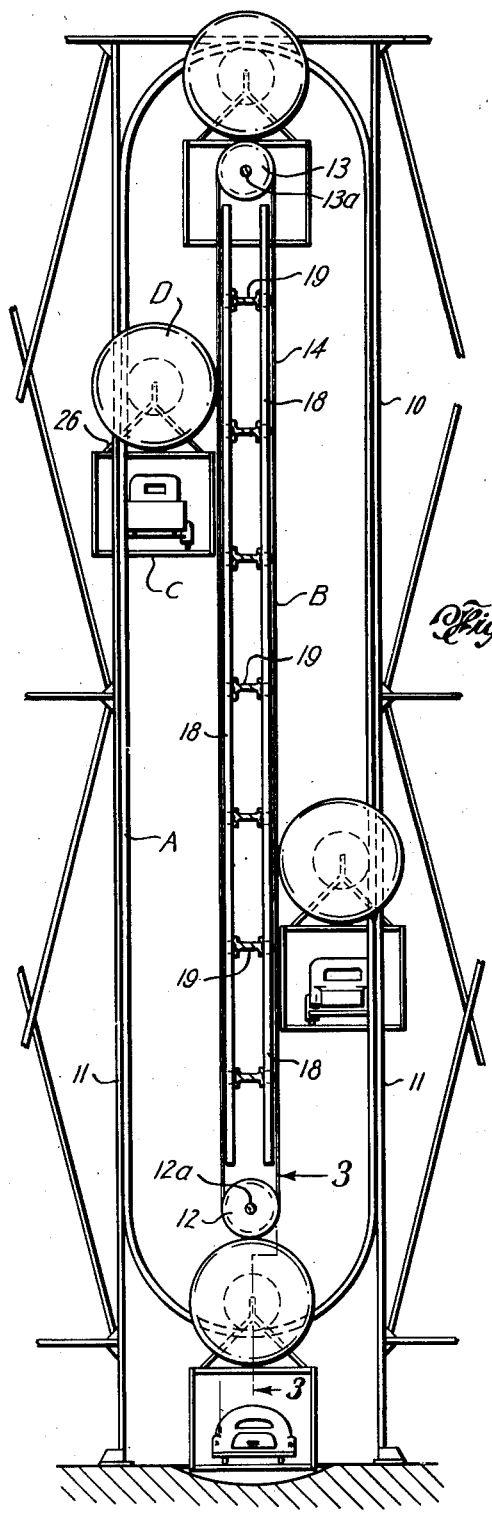
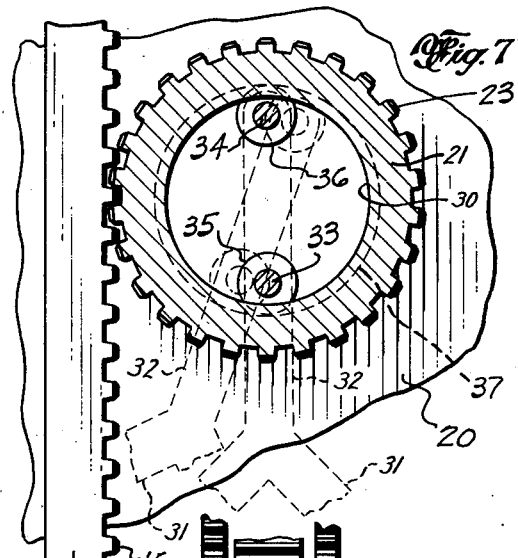
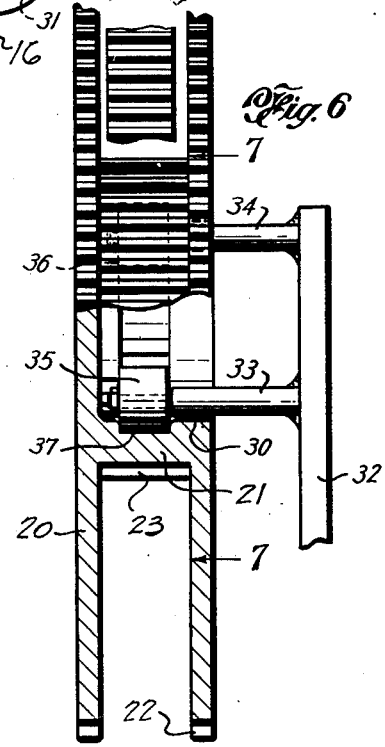
James G. McKenzie
INVENTOR
BY *J. Vincent Martin*
and
*Joe E. Edwards*
ATTORNEYS Sept. 2, 1952   J. G. McKENZIE   2,609,112
ELEVATOR APPARATUS
Filed March 26, 1949   3 Sheets-Sheet 2
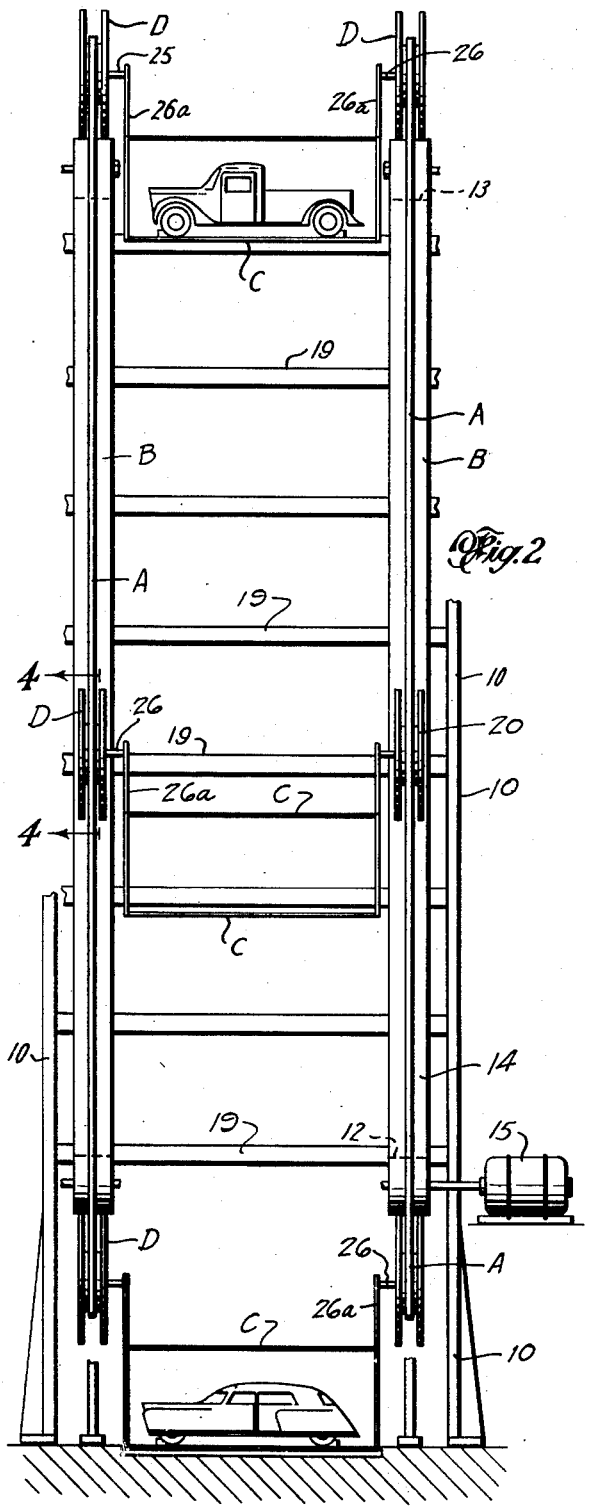
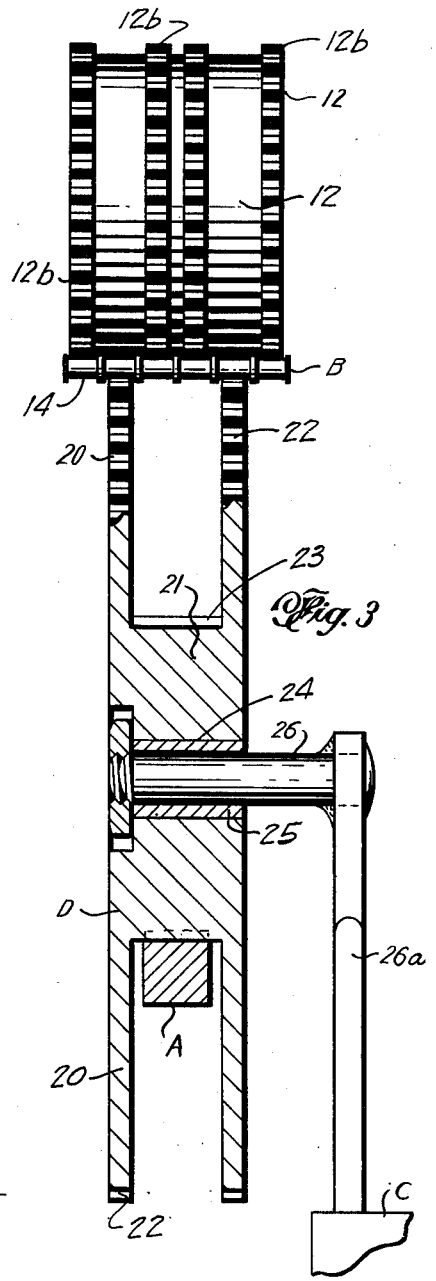
INVENTOR
James G. McKenzie
BY Vincent Martin
and
Joe E. Edwards
ATTORNEYS Sept. 2, 1952 J. G. McKENZIE 2,609,112
ELEVATOR APPARATUS
Filed March 26, 1949 3 Sheets-Sheet 3
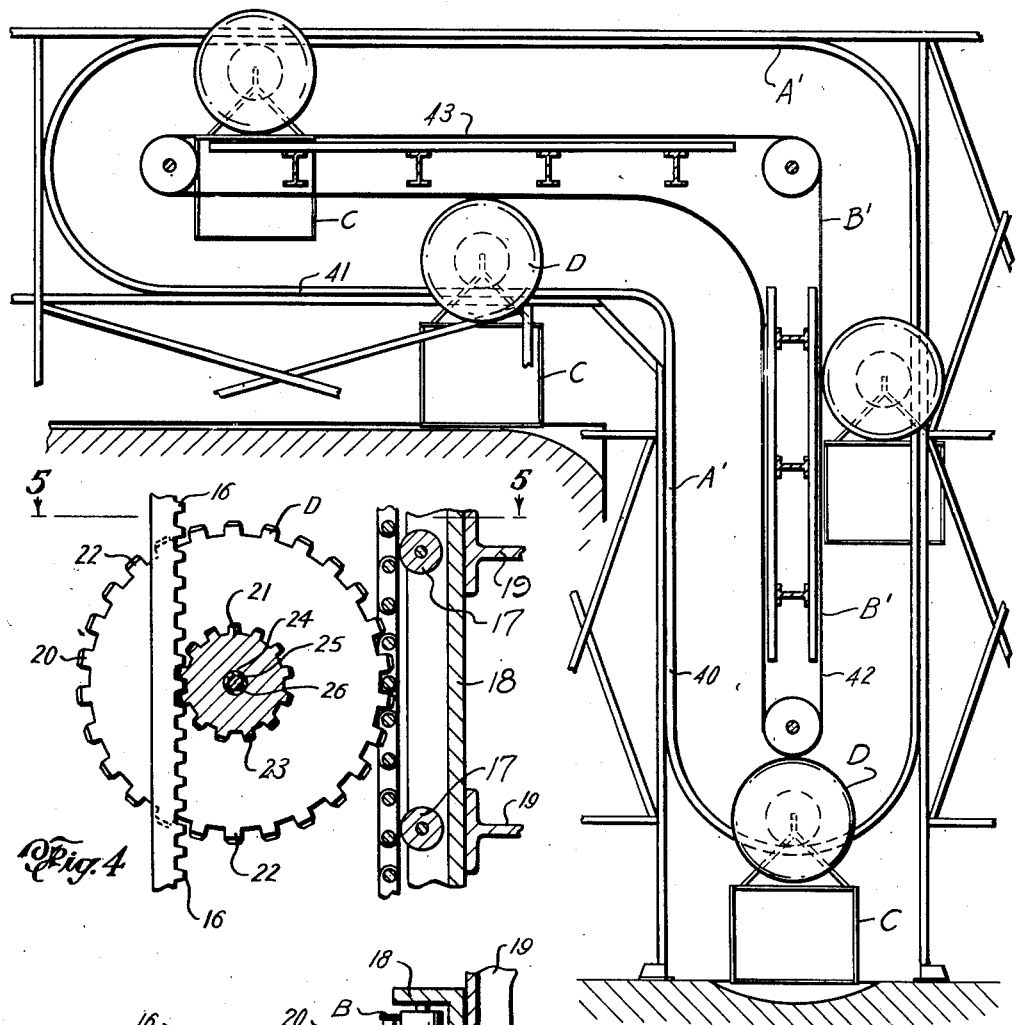
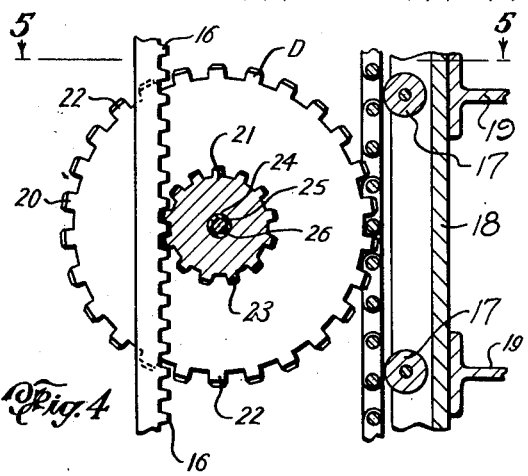
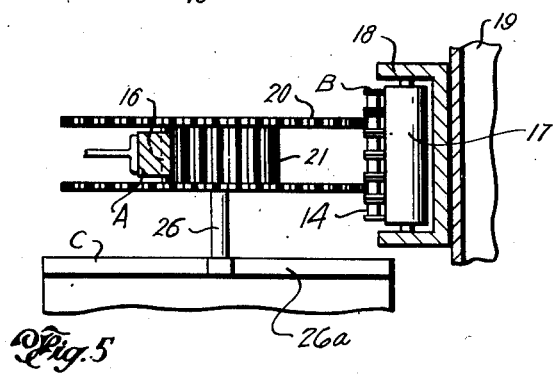
James G. McKenzie
INVENTOR
Vincent Martin
and
Jos E. Edwards
BY
ATTORNEYS Patented Sept. 2, 1952

2,609,112

UNITED STATES PATENT OFFICE 2,609,112

ELEVATOR APPARATUS

James G. McKenzie, Houston, Tex.

Application March 26, 1949, Serial No. 83,583

9 Claims. (Cl. 214—16.1)

This invention relates to new and useful improvements in elevator apparatus.

The invention relates particularly to elevator and conveying apparatus which is primarily adaptable for use as a vehicle parking tower for permitting the storage of a maximum number of vehicles in a minimum space.

Various elevating and conveying apparatus for storing vehicles, such as automobiles, in congested areas for the purpose of utilizing a minimum ground area have been proposed and have usually embodied conveyor systems comprising endless flexible elements, such as conveyor chains, upon which are suspended a plurality of vehicle storage platforms or supports. Ordinarily, the platforms or supports are suspended in such manner that each is held in an upright position by the force of gravity and the entire load is carried by the endless conveyor chains which must, therefore, not only furnish the required motive power but must also have adequate strength to support said load. The excessive wear on the endless chain system of the apparatus results in constant cost for upkeep and repair and substantially defeats the advantages of employing this type of conveyor in elevators which are used in lifting and conveying relatively heavy loads.

It is, therefore, one object of this invention to provide an improved elevator apparatus which is adaptable for use in lifting heavier loads and which, while employing the endless chain type of conveyor, is so constructed that excessive strain and wear on the conveyor is obviated.

An important object of the invention is to provide an improved elevator apparatus wherein the load-carrying platform is suspended from a carrier actuated by an endless conveyor, together with means for supporting only a relatively small portion of the load on the conveyor, whereby said conveyor functions primarily as the motive power and is not required to support the entire load which reduces wear and maintenance costs.

Another object is to provide an elevator apparatus wherein a movable carrier is confined between an endless conveyor and a rigid supporting member, together with co-acting means on the carrier and member for transferring the major portion of the carrier load to the rigid member to thereby relieve the conveyor of such load and eliminate undue strain or stress on said conveyor.

A particular object is to provide an apparatus, of the character described, wherein a carrier adapted to support the load being conveyed is in constant engagement with an endless chain conveyor and is also in constant engagement with a fixed gear rack which generally follows the path of the conveyor in spaced relation thereto; the arrangement being such that the conveyor maintains the carrier in engagement with said gear rack, whereby said rack supports the major portion of the carrier load and the conveyor's primary function is to merely impart movement to the carrier in a path along said rack.

A further object is to provide an apparatus which is particularly adapted for use as a parking tower, wherein a plurality of vehicle supporting platforms are each suspended from an individual carrier which travels along the path of a rigid gear rack and an endless conveyor arranged to engage the carriers to impart movement thereto; the positioning of the rigid gear rack with respect to the conveyor being such as to positively guide the carriers in their circuitous movement and particularly in their movements from a vertical to a horizontal, or from a horizontal to a vertical path.

Still another object of the invention is to provide an improved parking tower apparatus wherein the vehicle supporting platforms are pivotally suspended from movable carriers operated by an endless conveyor, together with means for adequately stabilizing the platforms to prevent undue swinging thereof particularly when the carriers pass around the ends of said conveyors and thereby change their direction of movement.

Other and further objects of the invention will appear from the description of the invention.

In the accompanying drawings, which form a part of the instant specification, which are to be read in conjunction therewith and wherein like reference numerals are used to indicate like parts in the various views:

Figure 1 is a side elevation of an elevating and conveying apparatus constructed in accordance with the invention and illustrating the same as used in a vehicle parking tower, Figure 2 is a front elevation thereof, Figure 3 is an enlarged sectional detail, taken on the line 3—3 of Figure 1, Figure 4 is an enlarged vertical, sectional view. taken on the line 4—4 of Figure 2, Figure 5 is a horizontal cross-sectional view, taken on the line 5—5 of Figure 4, Figure 6 is a view, similar to Figure 3, illustrating a stabililizing means associated with the carrier suspension, Figure 7 is a side elevation of the parts shown in Figure 6, and Figure 8 is a side elevation of a modified form of elevating apparatus.

The invention will be described as employed in a motor vehicle parking tower but it is pointed out that the apparatus may be employed as an elevator or conveyor for lifting and conveying any type of heavy load. Therefore, the illustration of the apparatus as a motor vehicle parking tower is not to be construed as limiting the invention to that particular use.

Referring to the drawings, the numeral 10 designates a supporting structure or framework which may be of any desired type and which includes a pair of oppositely disposed or spaced vertical columns or standards 11. The supporting structure or framework 10 may extend upwardly in a vertical plane, as shown in Figures 1 and 2, and has a pair of endless rigid gear racks A suitably secured thereto supported therein at opposite sides thereof. Each gear rack has gear teeth 16 formed along its inner surface and the gear racks form rigid guide and load supporting members, as will be explained. A pair of endless conveyors B are also mounted within and supported by the structure 10 and each conveyor is associated with one of the gear racks, being disposed in the same vertical plane as said gear racks. Thus, each rack and its associated conveyor are located at one side of the supporting structure or framework 10 with an area or space therebetween.

Each conveyor B comprises a lower drive sprocket 12 mounted on a stub shaft 12a and an upper idler sprocket 13 mounted on a stub shaft 13a. A multiple strand endless chain 14 passes over the sprockets 12 and 13 and a suitable motor 15 or other prime mover has connection with the shaft 12a of the drive sprockets 12 and when operated will function to cause the multiple strand chains 14 to travel over their respective sprockets. It is, of course, desirable that the lower sprockets 12 of each conveyor B be driven simultaneously and at the same speed and any suitable connecting gearing (not shown) between the stub shafts 12a and the prime mover may be employed for this purpose.

Each gear rack A generally follows the contour of its associated conveyor B so that the gear teeth 16 of said gear rack are spaced an equal distance from the multiple strand conveyor chain 14 at all positions therearound. The upper and lower curved ends of each gear rack are swung on the center of the shafts 12a and 13a of the conveyor sprockets 12 and 13, respectively whereby the space between the chain and the gear teeth 16 of the gear rack is maintained equidistant around the ends of said conveyor. Each multiple strand endless chain 14 is maintained in a true vertical position between its sprockets so as to extend parallel to the straight portions of its associated gear rack A by means of a plurality of guide rollers 17 which engage the rear or inner surface of the chain. Each series of guide rollers 17 is mounted within a channel member 18 and said channel members are interconnected by I-beams 19 which extend transversely across the frame structure and which are suitably secured to the structural members of the frame work 10. The rollers function to maintain the multiple strand chain in true alignment and also form a backing or support for the chain to overcome the inherent flexibility thereof.

From the foregoing, it will be seen that each gear rack A and its associated conveyor B are mounted one at each side of the supporting structure 10 whereby the central area within the structure is unrestricted and a plurality of load receiving platforms or supports C are adapted to travel between the gear rack and conveyor units. Each platform or support C may be of any desired construction and has one end open to permit a vehicle such as an automobile to be driven thereon. Each platform is suspended from a complementary pair of movable carriers D which are adapted to be actuated or moved by the conveyors B and the gear racks A whereby the carrier may be moved upwardly of and then downwardly of the supporting structure 10. Thus, a motor vehicle may be driven onto the platform or support when the same is in its lowered position at ground level and the conveyors may then be actuated to elevate the platform and the vehicle thereon. The platform may thus function as an elevator and subsequently as a storage place for the vehicle; when it is desired to remove the vehicle the conveyors B are operated to return the particular platform to ground level, after which removal of the vehicle may be effected. Each carrier D, as will be explained, is confined between the conveyor B and its associated gear rack and each platform C has complementary carriers D supporting the same with said complementary carriers being connected to each other by means of the platform. As the conveyor chains 14 are operated to travel over their respective sprockets the complementary carriers of each platform are caused to move along the path of the gear racks A and may thus be carried to an extreme upper position in the framework. Upon reaching such upper position a continued operation of the conveyors B will result in the carriers passing over the upper end of the upper sprocket 13 and then downwardly along the other side or space between the conveyors B and the gear racks.

Each carrier D comprises a double sprocket 20 connected by a hub 21 and the teeth 22 of the double sprocket are adapted to engage within two strands of the multiple strand chain 14. The hub 21 of each double sprocket forms a gear and is provided with gear teeth 23 which are adapted to mesh and engage with the teeth 16 of the associated gear rack A. The diameter of the sprockets 20 and the diameter of the gear formed on the hub 21 are such that when the sprocket teeth 22 are engaged with the conveyor chain 14, the gear teeth 23 are engaged with the teeth 16 of the associated gear rack. The gear formed on the hub 21 is maintained in engagement with the gear rack teeth because of the engagement of the chain with the sprocket and the reinforcement of said chain from its inner side by the rollers 17 prevents displacement of the parts. Thus, each carrier is confined between the conveyor chain and its associated gear rack and travels along the path defined by the space between said conveyor and rack.

Each carrier D is formed with an axial opening 24 which receives a bearing ring 25 and a suspension shaft 26 has its end mounted within this bearing. The shaft is connected by inclined bracket arms 26a to opposite sides of the platform or support C and obviously since two complementary carriers are provided for each supporting platform, the platform is suspended between the conveyor units B. Operation of the conveyor moves the platform C within the area between the two conveyors B. Because of the pivotal mounting or suspension of each platform from the center of the carriers D the tendency for the platform to swing as the carriers move upwardly over the uppermost sprocket or downwardly around the lowermost sprocket is reduced to a minimum.

Although the sprockets 12 and 13 of the conveyors may be of any desired construction, it is preferable that said sprockets be of the multiple type as indicated in Figure 3. As shown in this figure, the sprocket 12 is formed with a series of four toothed sections or series of teeth 12b, with the teeth of each section or series engaging one of the strands of the multiple strand chain 14. The upper sprocket 13 of each conveyor is also formed in this manner and thus, said conveyor sprockets actually engage a plurality of strands of the respective chains 14 while each carrier sprocket 20, being double, engages the remaining two strands.

The operation of the apparatus is obvious from the foregoing. Each vehicle supporting platform is suspended from a pair of complementary carriers D, each of which is associated with one of the conveyor and gear rack assemblies. The vehicle is driven onto the platform from one end thereof so that the longitudinal center of the vehicle is in substantially the same vertical plane as the point of suspension of the platform. In this manner, the particular length of the vehicle will not unbalance the platform.

The prime mover 15 is then operated to impart movement to the two conveyor chains 14 and said chains being in engagement with the respective sprockets 20 of the carriers D will cause said carriers to travel along the teeth 16 of the fixed or rigid gear racks A. The arrangement whereby the sprockets 20 and the gear 23 of each carrier are maintained in engagement with the chain and with the gear rack, respectively, results in a transfer of the load through the hub 21 and directly to the gear rack 16. Actually only a minor portion of the overall load is carried by the multiple strand chains 14 while the major portion is transferred to the gear racks which are rigid and substantial enough to carry such load without undue wear. Thus, the chains 14 are primarily a means for imparting rotation to the gears 23 so that said gears, through their engagement with the teeth of the gear racks, will move along the path of said racks. The gear racks not only form load-carrying members but also function as rigid guides for guiding the travel or movement of the carriers.

It is apparent that the carriers D may be halted at any point in their path of travel and because of the constant mesh of the gears 23 with the gear racks and the engagement of the sprockets with the conveyor chains said carriers will be locked in a stationary position when the operation of the conveyor chains is halted. As has been noted, the major portion of the load is transferred directly through the gears 23 to the gear racks with the result that the chains 14 are not subjected to excessive strain or wear by the excessively heavy loads. This is an important feature of the present invention since it provides all of the advantages of the endless type conveyor without unduly increasing maintenance and repair costs incurred by damage to the chains 14.

Each platform is preferably suspended from the center of the carriers D so as to reduce to a minimum any swinging movement which may be occasioned by a change in the direction or path of movement of the carriers. However, it may be desirable to apply some type of stabilizing means to the suspension and although any suitable well-known stabilizer could be employed for this purpose, a simple type of stabilizer is illustrated in Figures 6 and 7. In this instance, the hub 21 of each carrier D is formed with a relatively large bore 30 and a supporting bracket 31 is substituted for the bracket 26a. The bracket has an upwardly extending arm 32 formed with a lower inwardly directed suspension shaft 33 and with an upper inwardly directed stabilizing shaft 34 with both shafts being welded or otherwise secured to the arm 32 (Figure 6). The arms 33 and 34 carry rollers 35 and 36 at their inner ends which rollers are adapted to travel and are guided within an annular groove or recess 37 formed in the wall of the bore 30. The spacing between the rollers 35 and 36 is equal to the diameter of the bore 30 whereby the outer surfaces of the rollers 35 and 36 constantly ride within the groove or recess 37 to prevent outward displacement of the rollers from the bore 30. In this arrangement the load is suspended from the lower roller 35 and the upper roller 36 forms a stabilizing roller. It will be apparent that if there is any tendency for the supporting platform C to swing, as indicated by the dotted lines in Figure 7, the upper roller 36 being in engagement with the groove or recess 37 will prevent such swinging because the fulcrum point of the suspension means will be about the center of the lower roller. This arrangement provides a very simple type of stabilizer but as has been pointed out any suitable type may be employed.

Although the apparatus is particularly adaptable for use as a parking tower, in which event the motor vehicles can be unloaded only at the lower end of the conveyors because of the fact they are driven onto the platform from the end of said platform, the apparatus may be easily modified to function as an elevator and in Figure 8, such a modification is shown. In this modification the gear racks A' are provided and each gear rack has a vertical portion 40 and a horizontal portion 41. A conveyor B' similar in construction to the conveyor B is associated with each gear rack in the manner herebefore described and said conveyor has a vertical portion 42 and a horizontal portion 43 generally conforming to the vertical and horizontal portions of the racks. The horizontal portions 41 and 43 of the gear racks and conveyors overlie the second floor or the roof of a building which is adapted to store the vehicles.

The operation of the modified form is identical to the form shown in Figures 1 to 7 except that the carriers D will travel vertically from the lower end where the vehicle is loaded and upwardly along the vertical portions 40 and 42 of the racks and conveyors; the carriers will then move along a horizontal path which will dispose the vehicle platform adjacent the upper floor or roof at which point the vehicles may be removed from said platform. After the vehicle is removed, the platforms may be successively returned to ground level or to their original starting position for the reception of another vehicle. The operation of the conveyors and gear racks as well as their coaction with the carriers D is the same in this form of the invention as that heretofore described. In both forms, the major portion of the load being elevated and conveyed is transferred to the fixed substantial support in the form of the gear racks A and A', and said racks not only form load carrying members but also function as a guide means for guiding the travel of the carriers D. It is obvious that the conveyor chains 14 are relieved of the excessive load and are not required to carry such load with the result that said chains function primarily as the motive power which causes the carriers D to travel along the path of the gear racks.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having described the invention, I claim:

1. An elevator and conveying apparatus including, a pair of endless chain conveyors mounted in spaced relation to each other, a rigid gear rack encircling each conveyor in spaced relation thereto, and a movable carrier assembly mounted between each chain conveyor and its associated gear rack and comprising a sprocket in constant engagement with the chain conveyor, and a gear secured to the sprocket and in axial alignment therewith in constant engagement with the gear rack, and means for driving the conveyor chains whereby rotation is imparted to the sprocket of each carrier assembly to cause the gear of said assembly to travel along the gear rack which it engages.

2. An elevator and conveying apparatus including, a pair of endless chain conveyors mounted in spaced relation to each other, a rigid gear rack encircling each conveyor in spaced relation thereto, a movable carrier assembly mounted between each chain conveyor and its associated gear rack and comprising a sprocket in constant engagement with the chain conveyor, and a gear secured to the sprocket and in axial alignment therewith in constant engagement with the gear rack, and means for driving the conveyor chains whereby rotation is imparted to the sprocket of each carrier assembly to cause the gear of said assembly to travel along the gear rack which it engages, a load carrying support adapted to travel in the area between the endless conveyors, and means for suspending the ends of support from carrier assemblies with the point of suspension being in vertical alignment with the axis of the gear of each assembly whereby the major portion of the load imposed on each carrier assembly is directly transferred through its gear to the gear rack.

3. An elevator apparatus as set forth in claim 1, together with a reinforcing means engaging each conveyor chain to prevent undue flexing and to maintain said chain in engagement with the sprocket of the carrier assembly.

4. An apparatus as set forth in claim 1, wherein each conveyor chain is a multiple strand chain and also wherein the sprocket of each carrier assembly is a double sprocket with the hub between said sprockets forming the gear of said assembly.

5. An apparatus as set forth in claim 2, together with a stabilizer forming part of the suspension means for the load carrying support for minimizing swing movement of the support during its travel.

6. An apparatus as set forth in claim 1, wherein the conveyors and their associated guide members have a portion extending vertically and a portion extending horizontally, whereby the carrier assemblies are movable in both a vertical and a horizontal path.

7. An apparatus as set forth in claim 1, wherein the conveyors and their associated guide members have a portion extending vertically and a portion extending horizontally, whereby the carrier assemblies are movable in both a vertical and a horizontal path.

8. An elevator and conveying apparatus including, a pair of endless chain conveyors mounted in spaced relation to each other, a rigid guide member encircling each conveyor in spaced relation thereto, and a movable carrier assembly mounted between each chain conveyor and its associated guide member and comprising a sprocket in constant engagement with the chain conveyor, and a toothed element secured to the sprocket and in axial alignment therewith in constant engagement with the guide member, and means for driving the conveyor chains whereby rotation is imparted to the sprocket of each carrier assembly to cause the toothed element of said assembly to travel along the guide member which it engages.

9. An elevator apparatus including, a pair of endless conveyors mounted in spaced relation to each other, a rigid endless guide member associated with each conveyor and spaced equidistant around said conveyor, a movable carrier mounted between each conveyor and its associated guide member and having engagement with both said conveyor and member, whereby when said conveyors are operated the carriers are moved along the paths defined by the space between each conveyor and its associated guide member, said movable carrier including a rotatable toothed element in constant engagement with the conveyor and having a central circular recess therein, a suspension comprising an upright arm having spaced laterally directed shafts which engage the periphery of the circular recess, and a load-carrying support secured to the lower end of said upright arm, whereby said support is suspended from the toothed element and from the carrier assembly.

JAMES G. McKENZIE.

REFERENCES CITED

The following references are of record in the file of this patent:

UNITED STATES PATENTS

| Number | Name | Date |
| --- | --- | --- |
| 465,587 | Thorp | Dec. 22, 1891 |
| 904,717 | Palmer | Nov. 24, 1908 |
| 1,826,357 | Makutchan | Oct. 6, 1931 |
| 1,857,431 | Clark | May 10, 1932 |
| 1,882,656 | Creedon | Oct. 18, 1932 |
| 1,902,946 | Breed | Mar. 28, 1933 |
| 1,930,239 | Hunt | Oct. 10, 1933 |
| 2,113,308 | Morton | Apr. 5, 1938 |